Sept. 8, 1964     W. J. EAKINS ETAL     3,148,102
METHOD FOR THE MANUFACTURE OF MULTI-FILAMENT GLASS TAPES
Filed Aug. 24, 1960     2 Sheets-Sheet 1
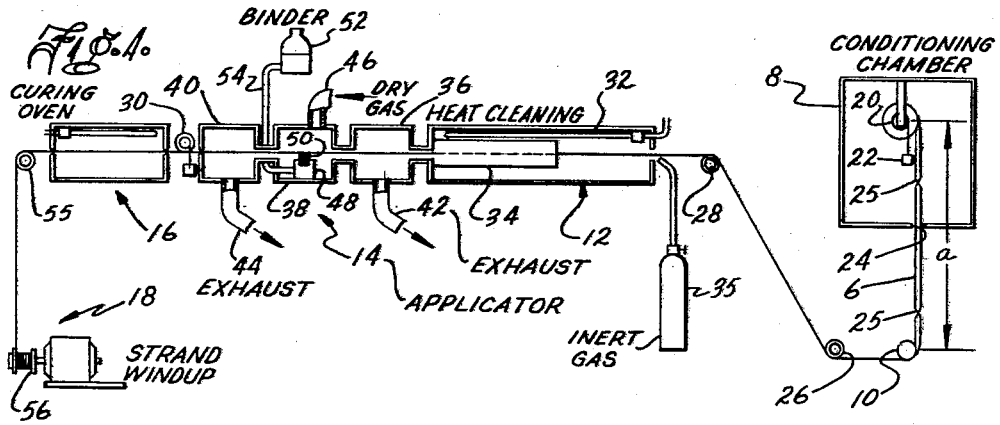
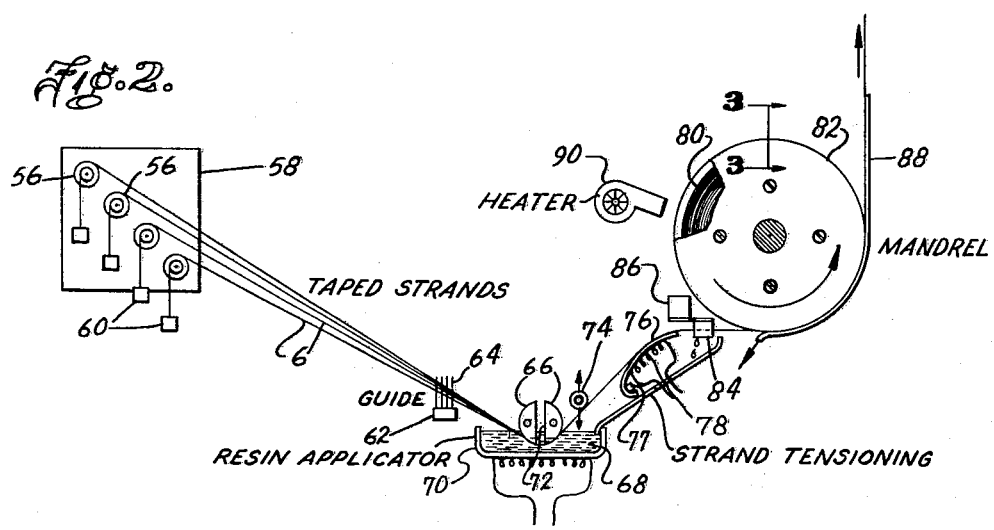
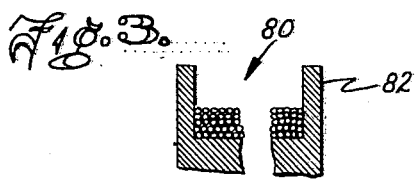
INVENTOR.
William J. Eakins
BY Chapin & Neal
Attorneys

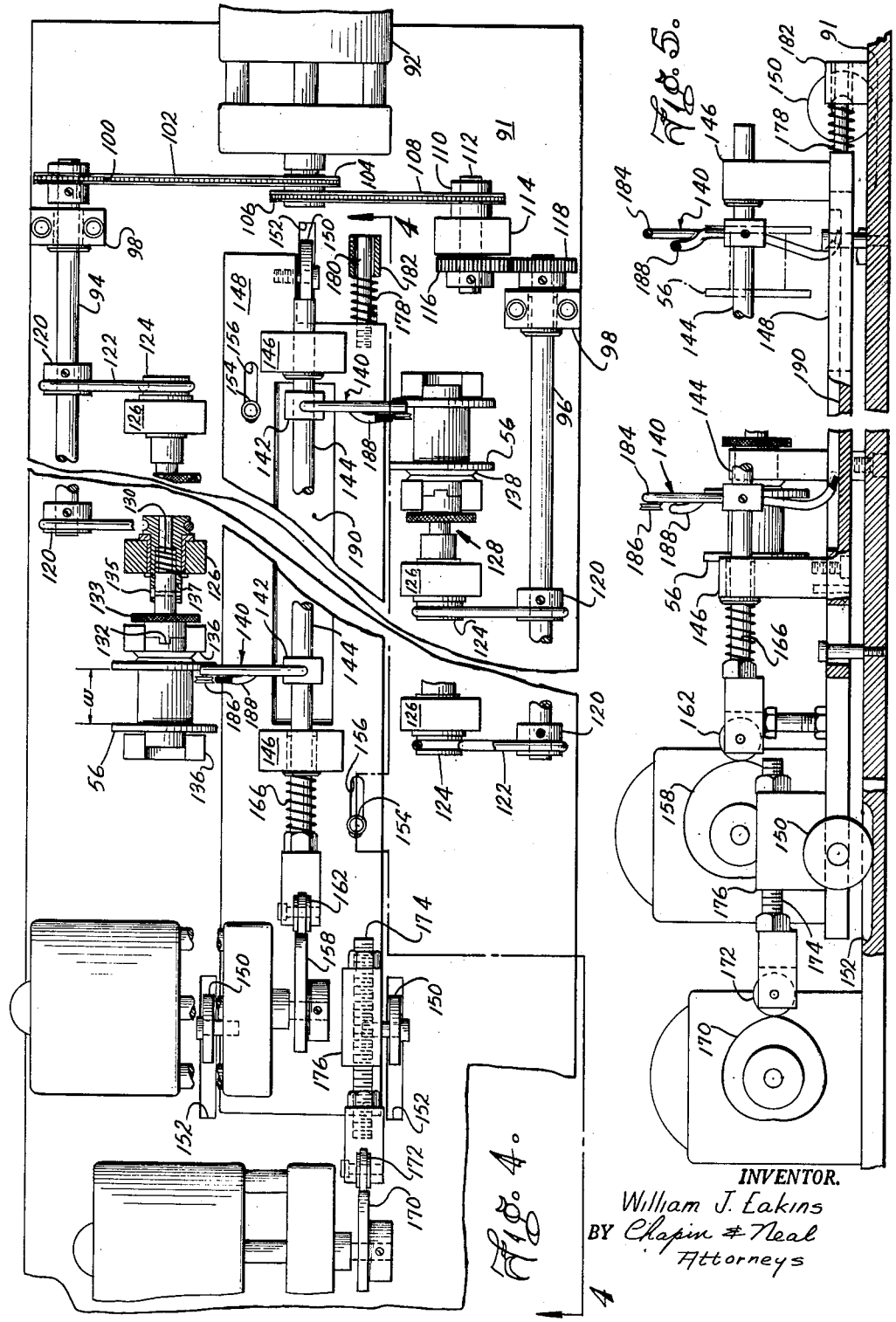

3,148,102
METHOD FOR THE MANUFACTURE OF MULTI-FILAMENT GLASS TAPES
William J. Eakins, Wilbraham, and Arthur J. Warner, Marion, Mass., assignors to DeBell & Richardson, Inc., Hazardville, Conn., a corporation of Connecticut
Filed Aug. 24, 1960, Ser. No. 51,565
3 Claims. (Cl. 156—161)

This invention relates to the manufacture of continuously wound resin-bonded glass fiber structures, and particularly to the manufacture of multi-filament glass tapes for use in such structures.

Multi-filament glass, now available for use in the manufacture of continuously wound resin-bonded structures, is produced by glass manufacturers in the form of a continuous strand wound on a forming tube or roll. The strands are coated with a suitable size such as a starch-oil emulsion to reduce the likelihood of filament breakage during handling. In winding on forming tubes, the size coated strand becomes twisted, first in one direction and then the other. The size sets the alternately directed or "compensated" twists. These roll-wound strands provide the starting material for the invention herein described.

The achievement of maximum strength in the manufacture of continuously wound multi-filament glass structures involves techniques to maximize glass density or content commensurate with complete resin-bonding of the filaments. Since roll-wound strands come from the glass manufacturer in a twisted condition, the achievement of maximum glass content, particularly in the manufacture of tubular structures, has posed a serious problem.

Another problem which has caused difficulty is the extreme care required in handling multi-filament glass fiber to avoid filament damage or breakage. The avoidance of filament damage is essential since the strength of continuously wound structures depends directly upon the glass content which is considerably diminished by broken or twisted filaments. For example, in a continuously wound structure, a single filament disposed obliquely to the other filaments of a strand can prevent the filaments in one layer from meshing with the filaments of the layer below, causing a substantial reduction of the glass content. Moreover, the problem of handling multi-filament glass is compounded since the size applied to enhance the strand handling properties must be removed before application of a coupling agent or finish. After removal of the size and before application of the finish, the glass filaments are extremely friable and must be handled with care.

One method presently employed for handling glass involves heat cleaning the strands without unwinding from the forming rolls. This method is known as "batch heat cleaning." Thereafter the heat cleaned strands are dipped in the finishing composition while still on the rolls. While this method minimizes handling, the strands cannot be satisfactorily unwound from the forming rolls because of filament entanglement and adhesion.

The principal object of this invention is to provide resin-bonded multi-filament wound structures of improved strength and modulus.

Another object of the invention is to provide multi-filament glass tapes in which the filaments are geometrically arranged to provide improved glass wound structures.

A further object of this invention is to provide improved methods and means for making multi-filament glass strands which minimizes the danger of filament damage or breakage, thus enabling spooling or unspooling the strands without excessive fraying.

Still another object of the invention is to provide improved apparatus for spooling multi-filament material which substantially eliminates the incidence of filament damage during unwinding.

The above and other objects and advantages of this invention will be apparent from the following description with reference to the accompanying drawings in which:

FIG. 1 is a diagrammatical view illustrating method and apparatus for making glass tapes for use in the manufacture of resin bonded structures;

FIG. 2 is a diagrammatical view showing a system for manufacturing resin bonded structures;

FIG. 3 is a section on a greatly enlarged scale taken along line 3—3 of FIG. 2;

FIG. 4 is a plan view of a winding apparatus for spooling glass tapes; and

FIG. 5 is a section taken along line 5—5 of FIG. 4.

In accordance with this invention, process and apparatus such as shown in FIG. 1 are provided for making multi-filament glass tapes from binder coated twisted glass strands 6. To simplify the drawing only one strand is shown, however, it is to be understood that in actual practice a plurality of such strands will be simultaneously handled by the same apparatus. The apparatus shown in FIG. 1 comprises a chamber 8 for pre-conditioning the binder coating to enable the strand to be untwisted, whereby the filaments making up the strand are oriented or aligned in mutually parallel relationship. This filament orientation is accomplished by means of a bar member 10 around which the strand 6 is tensioned, its direction being changed approximately 90°. The bar imparts to the strand a ribbon or tape-like cross sectional configuration. The glass strand in its oriented condition, will hereinafter be referred to as a "tape" or a "taped strand." Thereafter, the size is removed from the tape in a cleaning chamber, indicated generally at 12. Following the cleaning operation, a finish or binder in solution is applied to the tape by a finish applicator, indicated generally at 14. The binder or finish comprises a coupling agent capable of chemically reacting with both the glass and resin, which is to be subsequently applied in the production of laminated structures in a manner to be described below. Resinous materials are preferably included in the solution to improve the handling characteristics of the strand. The coupling agent and resinous materials provide a cross linking effect between the glass surface and laminating resin to be subsequently applied. Moreover, the resinous materials enhance the handling characteristics of the strand. Following the application of the finish, the tape is dried in a finish curing heater 16 and spooled by a winding apparatus indicated generally at 18.

The winding apparatus 18 continuously unwinds the strand from the roll on which it is mounted in the conditioning chamber 8 and advances it along a predetermined path through the various stages of the process. The speed of the winder is selected to advance the strand at a suitable rate through the successively arranged chambers for thorough heat cleaning, finishing and curing.

The conditioning chamber 8 comprises a cabinet suitably dimensioned to accommodate the number of strands to be simultaneously handled by the apparatus. Within the cabinet is provided a roll 20 for rotatably supporting each of the tube or roll-wound glass strands 6. The roll is provided with a frictional or Prony type brake, indicated at 22, to provide proper tensioning of the strand around the bar member 10 and throughout its length of travel through the cleaning and applicator chambers 12 and 14 respectively. The air within the chamber 8 is heated sufficiently to soften the size and its moisture content controlled to enable easy unwinding of the strands. Air at a temperature of not less than 95° F. and 50% relative humidity has been found suitable when the glass is coated with a starch-oil size. The cabinet is provided with an opening 24 for the strand 6.

The bar member 10 is circular in cross section and nonrotatably mounted a sufficient distance *a* from the roll 20 to provide a free strand length to accommodate at least two adjacent twists 25. This arrangement permits complete and continous untwisting of the strand as it is tensioned and drawn over the surface of the bar. A bar having a diameter of ½" effectively removes all twists from the strand. From this point in the process the advancing strand assumes a tape-like configuration, that is, generally rectangular in cross section with all filaments throughout the length of the strand being aligned in mutually parallel relationship.

Following the "untwisting" operation, the taped strand is guided around roll 26 and over a roller 28 at the entrance end of the cleaning chamber, and another roller 30 at the exit end of the applicator 14. Intermediate the rollers 28 and 30 the taped strand is in the form of a catenary, that is, it is unsupported throughout the steps of cleaning and applying the coupling agent and binder. The strands are thus kept out of contact with any surface or material which might cause damage or breakage of one or more of the delicate filaments. This is important because after the size is removed from a multi-filament strand of this type, the filaments are extremely friable. It is for this reason the strands are untwisted before they are cleaned.

The cleaning chamber 12 comprises an elongated, open-ended oven disposed along the path of the continuously advancing taped strand, which is drawn axially through the oven. The oven includes overhead infrared strip heating elements 32, a reflective lining, and a glass tube 34 to intensify the heat uniformly around the strand to insure complete removal of the binder coating. In the embodiment shown, the oven is approximately 7 feet in length; the glass tube is 4 feet long and disposed at the exit end of the oven. The diameter of the glass tube and oven are sufficient to simultaneously accommodate a plurality of strands. In cleaning 150 1/0, 204 filament, .00037" diameter E-glass a temperature of 750–800° F. is maintained over the first 3 feet of the oven and between 1125 and 1175° F. within the glass tube. The taped strand is moved at a speed of between 22 to 40 feet per minute. The factors of oven temperature, length and speed of tape advance are selected to insure adequate heat cleaning of the strand in its passage through the oven. The cleaning action is by evaporation and combustion of the starch-oil binder.

If the finish (coupling agent plus resinous materials) is to be applied in an anhydrous solvent, an anhydrous atmosphere is preferably provided within the chamber 12 and the glass tube 34 by injecting into the entrance end of the chamber, as indicated at 35, a gas such as nitrogen, oxygen, ammonia, carbon dioxide or the like. One advantage in using such a gas is to control or eliminate the moisture present during the heat cleaning operation. By this treatment the layer of adsorbed water on the surface of the glass filaments is reduced to a minimum. As a result, the glass reactive portion of the coupling agent may react with either the glass surface itself or the water which is sufficiently close to that surface to act as a high stress transfer agent. Minimizing the water layer is therefore an important consideration in obtaining an improved bond between the glass and coupling agent. As will be apparent from the description of the applicator chamber, anhydrous atmospheric conditions may be and preferably are maintained until after the finish is applied in the applicator 14. However, if the finish is to be applied in an aqueous solution, anhydrous conditions need not be maintained.

The finish applicator 14 is disposed closely adjacent the exit end of the oven and comprises an applicator chamber 38 flanked by exhaust compartments 36 and 40. The exhaust compartments are connected to opposite ends of the applicator chamber. The first exhaust compartment 36 also communicates with the exit end of the heating chamber 12 and the glass tube contained therein. Tubes 42 and 44 are connected to the compartments 36 and 40 respectively for exhausting air from the applicator chamber 38 and from the heat cleaning chamber 12. Dry air, nitrogen or other suitable gas may be supplied to the center compartment by means of a tube 46. Thus, as explained above, when the finish is to be applied in an anhydrous solvent, the atmosphere in both the applicator chamber and heating chamber is controlled to provide anhydrous conditions. By keeping the glass in a moisture-free atmosphere throughout the steps of heat cleaning and finish application the thickness of the adsorbed water layer is minimized.

A trough 48 is provided in the applicator chamber 38. The height of said trough is such that its upper surface is spaced slightly below the tape 6. A wick 50 of absorbent material, such as cotton batting is disposed in the trough. The wick is maintained in a moistened condition by a gravity feed system which comprises a reservoir 52 containing a finish dissolved in a solvent that may be water, contain water, or be anhydrous. A tube 54 extends from the reservoir to the trough for maintaining the wick in a saturated condition. The height of the reservoir is adjustable for maintaining the trough in a flooded condition. The wick extends sufficiently above the trough to be lightly engaged by the advancing strand. After the strand is cleaned in the oven it passes directly into the first exhaust compartment 36 in which it is cooled to a suitable temperature for reaction with the finish, applied by the wick 50. As the strand is drawn across the wick it is moistened by the coupling agent. Thereafter the moistened tape passes through the exhaust compartment 40 and around the tensioning roll 30.

The strand makes one turn around the tensioning roll which is provided with a frictional brake to increase tension of the tape strand during drying and curing in the curing oven 16. The object of the increased tension is to compact the filaments of the tape strand. The tape is thus spread horizontally and its thickness reduced during curing of the finish. This sets the taped strand into a flat ribbon-like cross section.

The curing oven is maintained at a suitable temperature to evaporate the solvent and to react the coupling agent with the glass surface during transit of the tape through the oven. The tape is then led over the roller 55 and to the winding apparatus 18 where it is wound on spools 56 for subsequent use.

In FIG. 2 apparatus is shown for manufacturing continuously wound tubular structures using as the starting material the spool-wound glass tapes produced by the process and apparatus described above. The apparatus comprises a spool rack or creel 58 on which a plurality of spools 56 are rotatably supported for unwinding the tapes 6. Each spool is provided with a frictional brake 60 for equally tensioning the taped strands. The braking of the unwinding spools is adjusted precisely and equally to allow maximum tension without filament breakage. In this way the filament alignment and parallelism are maintained. A strand guide 62, including a plurality of upwardly extending pins 64, gathers the individual tapes into contiguous edge-to-edge relation. The taped strands are led from the strand guide under a pair of semi-circular, stationary guides 66, the lower portions of which are immersed in a suitable bonding resin 68, such as epoxy, phenolic, silicone or polyester contained in a heated reservoir 70. A space 72 is provided between the guides 66 for uniform distribution of the resin over the strand filaments. After the bonding or laminating resin is applied the strands pass under a vertically adjustable tensioning roll 74 and then over the surface of a curved plate 76. The roll 74 adjusts the tension of the ribbon entering the mold to give controlled and, if necessary, a programmed tension value.

Vertical adjustment of the roll 74 varies the extent of surface contact of the ribbon and plate and permits accurate adjustment of strand tension. The strand tension is set to a value to maintain filament alignment and parallelism and to restrict filament movement. It has been found that under optimum tension, glass filaments are not as friable as glass run under too light loading. To provide accurate control of the ribbon tension, a strain gauge 77 is provided to measure deflection of the plate 76. A heating element 78 heats the plate 76 sufficiently to maintain the resin in a free flowing condition to facilitate removal of surplus resin and control the frictional drag on the filaments as they are drawn over the plate. Tensioning over the surface of the plate spreads the filaments into a generally uniform ribbon of parallel equi-tensioned filaments having an overall width corresponding to the width of the cavity 80 of a rotating mandrel or mold 82 on which it is wound. In addition to the vertical position of the roll 74, the Prony brake loads applied to the spools, the speed of rotation of the mold, and the temperatures maintained in the resin bath and spreader plate determine the tension of the ribbon applied to the mold.

Between the upper edge of the plate and the rotating mold is located a guide 84 for laying the strands in the cavity of the rotating mold. A vibrator 86 oscillates the guide, thereby vibrating the filaments to remove excess resin and so closely compact the filaments as they are laid in the mold. An absorbent strip 88 is pressed against the surface of the mold-wound ribbon to further compact the successively wound layers of filaments and for further removal of surplus resin. The combined action of the vibrator, pressure of the strip 88 and the ribbon tension minimizes the distances separating the individual ribbon filaments. As shown in FIG. 3, in the final resin bonded form, the ribbon layers of filaments forming the structure lose their identity and there remains in the cross section of the hoop structure a multiplicity of individual filaments arranged in a close uniform geometric packing all bonded together with resin. A heat gun 90, disposed outwardly of the periphery of the mold, directs a stream of heated air at the surface of the ribbon for reducing the viscosity of the resin during the winding operation, enabling entrapped air to escape and allowing continued removal of surplus resin. The ribbon is continuously laid on the rotating mold until the cavity is completely filled. It will be noted that once the resin is applied the taped strands do not contact any moving surfaces which might disrupt the filament alignment or uniform tensioning. Furthermore, the strands are tensioned while moist and before entering the mold. Thus a maximum number of filaments are equally tensioned.

After the ribbon is wound on the mold it is placed in an oven of sufficient temperature and for a sufficient length of time to gel and cure the resin. After the cure is completed the tubular structure may be removed from the mold and machined to desired dimensions.

Tubular structures manufactured in accordance with the above-described process have been found to possess superior flexural strength and modulus. This is due primarily to the high glass content of the structure achieved by parallel geometric placement of the filaments in the mold cavity with resulting minimum volume of the resin matrix.

A problem frequently encountered in the manufacture of wound structures of the above-described type is filament breakage occurring when the tape is unwound from the spools 56. Such damage is caused by filaments sticking or rubbing against each other as the tape is unwound. This undesirable result is aggravated by the manner in which the tape is wound. Intermesh of the filaments of successive strand layers and engagement of the filaments in laterally adjacent strand turns are a principal cause of filament damage.

Shown in FIGS. 4 and 5 is a winding apparatus which overcomes the problem described above. The apparatus includes oscillating strand guides for laying the taped strand on a spool. The oscillating motion comprises an irregular pattern reversal coupled with rapid direction reversal. This results in the turns of the tape being spaced laterally from adjacent turns and laid at a sufficiently large oblique angle to the underlying turns to prevent filament intermesh.

The winding apparatus comprises a base plate 91, a motor 92 mounted on the plate and drivingly connected to a pair of spaced parallel shafts 94 and 96, each supported by spaced blocks 98 extending from the upper surface of the base plate. A sprocket 100, mounted on one end of the shaft 94, is driven by a chain 102 also meshed with a sprocket 104 driven by the shaft of the motor 92. Another sprocket 106, also driven by the motor 92, drives a chain 108 which is meshed with a sprocket 110. The sprocket 110 rotates a shaft 112, journaled in a block 114 for driving an idler gear 116 which is meshed with a gear 118 fixed to the shaft 96. By this arrangement the shaft 96 is rotated in the opposite direction from the shaft 94.

Fixed at axially spaced points along the shafts 94–96 are a plurality of pulleys 120. Each pulley is drivingly connected by a belt 122 to a spool driving pulley 124. Each of the pulleys 124 is journaled in a block 126. Slidable coaxially of the pulley 124 is a coupling member 128. A spring 130 urges the coupling member into driving engagement with the spool 56. A cross pin 135 connects the pulley 124 and coupling member 128. A slot 137 permits axial movement of coupling member for connecting and disconnecting spools. Each spool is provided with a slot 132 for receiving a lug projecting from the face of the coupling member. A knurled actuating disk 133 is provided for successively engaging and disengaging the coupling member from the spool.

Each of the spools 56 is rotatably supported by a pair of spaced upwardly opening U-shaped supports 136. The spool may thus be removed from the supports by simply compressing the spring 130 and lifting the spool from the support members 136. The spools 56 include pulleys 138 for receiving a brake band for tensioning the strand when unwinding, as shown in FIG. 2.

Intermediate the drive shafts are a number of strand laying guides 140, one for each spool, mounted for reciprocating movement parallel to the axes of the rotating spools. The strand guides are carried by blocks 142 fixed at axially spaced points on a rod 144. The rod is slidably supported by a pair of spaced blocks 146 which extend from the upper surface of a carriage 148.

The carriage 148 is supported by rollers 150 for movement parallel to the spool axes. Slots 152 are provided in the base plate 91 for receiving and guiding the carriage wheels. Studs 154 extend from the plate 91 and are received in elongated slots 156 for guiding movement of the carriage parallel to the spool axes.

Means is provided for reciprocating the rod 144 relative to the spools and in the embodiment shown comprises a motor driven heart-shaped uniform motion cam 158 supported by the carriage 148 adjacent one end of the guide supporting rod 144. A cam follower 162 is urged into engagement with the cam by means of a spring 166.

The winding apparatus also includes means for reciprocating the carriage 148 relative to the spools 56. This includes a second motor driven heart-shaped uniform motion cam 170 mounted on the base plate 91 adjacent one end of the carriage. A cam follower 172 is supported by a rod 174 which extends from a block 176 sceured to the upper surface of the carriage. The follower 172 is urged into engagement with the cam by means of a coil spring 178 disposed around a rod 180 which extends from the end of the carriage opposite the follower 172. The rod is slidingly received in a block 182 fixed to the plate 91.

Rotation of the cam 170 moves the carriage 148 slowly back and forth parallel to the winding spools. Since the rod 144 is mounted on the carriage, the rod is also oscillated at the same rate relative to the spools. Rotation of the cam 158, carried by the carriage, oscillates the rod 144 back and forth in the support blocks 146. The cam 170 is rotated at a relatively low speed, while the cam 158 is rotated at a relatively high speed. Thus the rod 144 is oscillated by the combined motion imparted by the low and high speed cams. This results in an irregular winding pattern. Furthermore, the heart-shaped cams provide rapid reversal of the winding direction to prevent one turn being parallel to an underlying turn. Moreover the combined throw of the cams is sufficient to enable the strands to be laid over the entire width of the spools. Preferably the combined throw of the cams 158 and 170 is greater than the width $w$ of the spools to account for the lag of the strand relative to the guide.

Each strand laying guide 140 comprises a rod 184 which extends upwardly and outwardly from the block 142. A small sheave 186 is rotatably supported adjacent the outer end of the rod for laying the taped strand on the spool. Oscillation of the rod 144 by the cams 158 and 170 is related to the winding speed so each turn of the tape is spaced laterally from the preceding turn. Moreover, the irregular pattern and rapid direction reversal provides a sufficiently large oblique angle between each turn and the turns forming the underlying layer of strands to prevent intermesh of the strand filaments.

Under certain circumstances before winding the taped strand on a transfer spool, the strand is moistened with water to prevent the strand filaments from spreading out on the spool and also to reduce the incidence of filament entanglement. This procedure is especially advantageous when a finish has been used which gives poor adhesion between the filaments of the strand.

The strands are moistened prior to winding on the spools by means of wicks 188 supported by the rods 142. The lower ends of the wicks are immersed in water contained in a recess 190 in the upper surface of the carriage 148. The water is supplied by capillary action to the outer ends of the wicks which may be placed in contact with the strands.

Having thus described this invention, what is claimed is:

1. Method of making tape strands from roll-wound, size-coated multi-filament glass having alternate oppositely directed twists comprising continuously unwinding a strand from its roll in an atmosphere heated sufficiently to soften the size coating and of sufficient humidity to enable unwinding the strand without sticking, advancing the strand along a predetermined path, and at points along said path orienting filaments of the strand into mutually parallel relationship to remove said twists throughout the length of the strand, heat cleaning the untwisted strand subsequent to removal of the twists, applying a binder to the clean strand in an anhydrous atmosphere, and curing the binder.

2. Method as set forth in claim 1 in which the twists are removed by drawing the strand over a bar with sufficient tension to orient the filaments thereof in mutually parallel relationship, said bar being located at a distance from the roll not less than a portion of said strand having two adjacent twists.

3. Method of making tape strands from roll-wound, size-coated multi-filament glass having alternate oppositely directed twists comprising drawing the strand from its roll in a chamber having an atmospheric temperature and humidity sufficient to soften the size coating and enable unwinding without filament breakage, drawing and tensioning the strand along a predetermined path, and at points along said path, orienting the filaments of said strand into mutually parallel relationship, whereby said twists are entirely removed throughout the length of the strand, continuously heat cleaning the strand after it has been untwisted, applying a binder to the cleaned strand in an essentially anhydrous atmosphere, thereafter tensioning the strand to just below its breaking tension, and curing the binder while said strand is under said maximum tension.

References Cited in the file of this patent

UNITED STATES PATENTS

| | | |
|---|---|---|
| 1,608,331 | McElwain | Nov. 23, 1926 |
| 2,350,369 | Sampair et al. | June 6, 1944 |
| 2,415,023 | Novotny | Jan. 28, 1947 |
| 2,617,468 | Holcomb | Nov. 11, 1952 |
| 2,644,780 | Simkins et al. | July 7, 1953 |
| 2,689,813 | Lawrence | Sept. 21, 1954 |
| 2,699,415 | Nachtman | Jan. 11, 1955 |
| 2,725,090 | Runton et al. | Nov. 29, 1955 |
| 2,834,704 | Lawrence | May 13, 1958 |
| 2,951,782 | Eilerman | Sept. 6, 1960 |

FOREIGN PATENTS

| | | |
|---|---|---|
| 652,005 | Great Britain | Apr. 11, 1951 |